(12) United States Patent
Yang et al.

(10) Patent No.: US 6,860,157 B1
(45) Date of Patent: Mar. 1, 2005

(54) FLUIDIC OSCILLATOR

(75) Inventors: Jing-Tang Yang, Hsinchu (TW); Wei-Chih Lin, Banciao (TW); Kuen-Jyh Tsai, Taishan (TW); Ker-Jer Huang, Longtan (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 10/769,627

(22) Filed: Jan. 30, 2004

(51) Int. Cl.$^7$ ............................................... G01F 1/19
(52) U.S. Cl. ................................... 73/861.19; 137/836
(58) Field of Search ..................... 73/861.19; 137/835, 137/836, 826

(56) References Cited

U.S. PATENT DOCUMENTS

| | | | | |
|---|---|---|---|---|
| 4,244,230 A | * | 1/1981 | Bauer ....................... | 73/861.19 |
| 4,838,091 A | * | 6/1989 | Markland et al. ......... | 73/861.19 |
| 4,976,155 A | * | 12/1990 | Challandes .............. | 73/861.19 |
| 5,339,695 A | * | 8/1994 | Kang et al. ............... | 73/861.19 |
| 5,749,525 A | * | 5/1998 | Stouffer .................... | 239/284.1 |
| 5,959,216 A | * | 9/1999 | Hocquet et al. ......... | 73/861.19 |
| 6,186,409 B1 | * | 2/2001 | Srinath et al. ................. | 239/1 |

* cited by examiner

*Primary Examiner*—Edward Lefkowitz
*Assistant Examiner*—Jewel V. Thompson
(74) *Attorney, Agent, or Firm*—Raymond Y. Chan; David and Raymond

(57) ABSTRACT

A fluidic oscillator includes an oscillator body having two attachment walls defining an oscillating chamber therebetween, an inlet duct communicatively extended from the oscillating chamber for guiding a flow of fluid entering into the oscillating chamber, an outlet duct communicatively extended from the oscillating chamber for guiding the flow of fluid exiting from the oscillating chamber, a flow splitter provided at the outlet duct to communicate with the oscillating chamber, and two feedback channels communicating with the oscillating chamber. Each of the attachment walls has an upstream portion and a downstream portion integrally extended therefrom as a step shouldering manner to form a modulating shoulder for modulating an oscillation of the flow within the oscillation chamber so as to stabilize the flow of the fluid to pass through the oscillator body.

20 Claims, 5 Drawing Sheets

FLUIDIC OSCILLATOR

BACKGROUND OF THE PRESENT INVENTION

1. Field of Invention

The present invention relates to hydrodynamic measuring device, and more particularly to a fluidic oscillator for a flowmeter, wherein when a flow of fluid passes through an oscillation chamber of the fluidic oscillator, the flow rate of the fluid is linearly proportional to the frequency of the fluidic oscillation for minimizing the turbulent of the fluid within the fluidic oscillator so as to precisely measure the flow of fluid.

2. Description of Related Arts

A conventional fluidic oscillator is generally employed in a flowmeter for measuring a flow of fluid. The conventional fluidic oscillator generally comprises an oscillator body having two attachment walls 1A defining an oscillating chamber 2A therebetween, an inlet 3A extended from the oscillating chamber 2A, an outlet 4A extended from the oscillating chamber 2A, a splitter 5A provided at the outlet duct 4A, and two feedback channels 6A communicating with the oscillating chamber 2A.

When a flow of fluid passes to the oscillating chamber 2A through the inlet 3A to fill up the oscillating chamber 2A, the fluid is guided to split at the splitter 5A to flow towards the outlet 4A and back to the oscillating chamber 2A through the feedback channels 6A, such that the fluid is started to oscillate within the oscillating chamber 2A.

In order to precisely measure the flow rate of the fluid, the turbulent of the fluid must be minimized. Accordingly, Reynolds number is widely used to determine the turbulent of the fluid, wherein the Reynolds number is implemented as the relation between the dimension of the fluidic oscillator and the velocity of the fluid flow. Therefore, at larger Reynolds numbers, the flow of fluid becomes turbulent.

When the fluid flows into a symmetric divergent or sudden-expansion channel, it often diverts toward either side in a specific range of Reynolds number due to the Coanda effect (Tritton, 1988). Then the flow develops to be either an asymmetric flow structure or a periodically oscillating flow pattern. Previous research reported the specific correlations among the oscillation characteristics and flow parameters (Igarrashi, 2000; Shakouchi, 1989). As the oscillation frequency is linearly proportional to the flow rate, the oscillator could be adopted as a flowmeter. Moreover, these specific correlations are also widely used for atomizers, mixers, and memory and control devices (Groisman et al, 2003).

The conventional fluid oscillator usually provides a measuring range that when the velocity of the flow falls within the measuring range, the conventional fluid oscillator is adapted to precisely measure the flow rate of the fluid. However, if the velocity of the flow is over the measuring range, the flow of fluid becomes turbulent so as to affect the accuracy of the measuring result. As shown in FIGS. 1 and 2, U.S. Pat. 3,902,367 and U.S. Pat. 4,610,162 illustrate the different designs of the dimension of the oscillation chamber of the fluidic oscillator to minimize the turbulent of the fluid.

Based on the operation principles, the fluidic oscillators are categorized as the feedback oscillator, the Karman vortex oscillator, and relaxation oscillator. Although the flow oscillation in a fluidic oscillator is usually initiated by the Coanda effect, the features of oscillation could be significantly altered by the design of feedback channels and the flow control loop.

Tippetts et al. (1973a, 1973b) deduced four major parameters for relaxation type fluidic oscillator, namely, Strouhal number (Str), Reynolds number (Re), Euler number (Eu), and dimensionless control loop inductance (L'), defined as follows.

$$Str = fl/u \quad (1)$$

$$Re = ul/v \quad (2)$$

$$Eu = 2\Delta p/\rho u^2 \quad (3)$$

$$L' = 4I'n/(\pi d'^2) \quad (4)$$

wherein 1 is the characteristic length of the oscillator, f is the frequency of pressure fluctuation, u is the inlet velocity of flow, v is the viscosity, $\Delta p$ is the pressure loss, and $\rho$ is the fluid density. In addition, $I' = I/d_n$ and $d' = d/d_n$. I and d are the length and diameter of the control loop respectively. $d_n$ and n are the width and aspect ratio of the inlet port respectively. Tippetts et al. further reported that if the Reynolds number was smaller than a critical value, no more fluctuation occurred. In a certain range of Reynolds number, the Strouhal number remained a constant, and therefore the oscillation frequency was linearly proportional to the flow rate and independent of the fluid properties. In addition, the dimensionless control loop inductance was found to have a linear correlation with the Strouhal number. Wang et al. (1996–1998) combined a vortex amplifier with the oscillator and significantly improved both pressure loss and oscillation spectra of an oscillatory flowmeter. The design was used for remote monitoring of the crude oil pipes. Comparin et al. (1962) pointed out that the oscillator with great depth-to-width ratio inlet nozzle was less affected by the Reynolds number. Yamasaki et al. (1981) systematically evaluated the function of flow splitter while systematically varied its location and length. Honda (2000) reported that when the v-gutter was chosen as the splitters, the Strouhal number became large, but it no longer remained a constant.

The research results on feedback oscillator were relatively less reported (Wright, 1980). However, many related patents have been published in 1975~2000 (Grant et al., 1975, Adams, 1979; Herzl, 1985; Okabayashi et al., 1986; Stouffer et al., 1998). For the miniature design, Gebhard et al. (1996) used LIGA microfabrication technique to produce a micro oscillator with length 720 sun, width 500 $\mu$m, depth 250 $\mu$m. Gebhard et al. (1997) further successfully combined the micro oscillator with a micro actuator to be a dynamic micro system. Teser et al. (2000) suggested to replace the Reynolds number with a pressure drop and derived a Teser number for characterizing the micro oscillator.

To extend the application of the fluidic oscillator from the regime of macroscale toward the microscale system need in-depth understandings of hydrodynamics. However, most of the previous work on fluidic oscillator emphasized more on the design rather than the hydrodynamical structure.

SUMMARY OF THE PRESENT INVENTION

A main object of the present invention is to provide a fluidic oscillator for a flowmeter, wherein a regulating shoulder is formed on each of the attachment walls within the oscillation chamber of the fluidic oscillator to modulate the oscillation of the flow within the oscillation chamber, so as to precisely measure the flow of fluid.

Another object of the present invention is to provide a fluidic oscillator, wherein when a flow of fluid passes through the oscillation chamber of the fluidic oscillator, the flow rate of the fluid is linearly proportional to the frequency of the fluidic oscillation for minimizing the turbulent of the fluid within the fluidic oscillator.

Another object of the present invention is to provide a fluidic oscillator, wherein at the same flow rate, the signal to noise ratio (SNR) of the fluidic oscillator of the present invention is higher than that of the conventional fluidic oscillator, such that the measurement result of the present invention is accurate in comparison with the conventional fluidic oscillator.

Another object of the present invention is to provide a fluidic oscillator, wherein the pressure loss between the inlet and the outlet of the fluidic oscillator with respect to the flow rate is higher than that of the conventional fluidic oscillator so as to minimize the turbulent of the fluid while increasing the flow rate. In other words, the measuring range of the fluidic oscillator of the present invention is larger than that of the conventional fluidic oscillator to measure a lower or a higher flow rate.

Another object of the present invention is to provide a fluidic oscillator, which is adapted to modulate the recirculating bubbles oscillating between the attachment walls and the splitters so as to improve the feedback effect on the flow in the fluidic oscillator.

Accordingly, in order to accomplish the above objects, the present invention provides a fluidic oscillator, comprising:

an oscillator body having two attachment walls defining an oscillating chamber therebetween, an inlet duct communicatively extended from the oscillating chamber for guiding a flow of fluid entering into the oscillating chamber, an outlet duct communicatively extended from the oscillating chamber to align with the inlet duct for guiding the flow of fluid exiting from the oscillating chamber, a flow splitter provided at the outlet duct to communicate with the oscillating chamber, and two feedback channels communicating with the oscillating chamber, wherein each of the feedback channels is extended from the outlet duct at the flow splitter to the inlet duct for splitting the flow of fluid to flow from the oscillating chamber back to the inlet duct; wherein each of the attachment walls has an upstream portion and a downstream portion integrally extended therefrom as a step shouldering manner to form a modulating shoulder for modulating an oscillation of the flow within the oscillation chamber so as to stabilize the flow of the fluid to pass through the oscillator body.

These and other objectives, features, and advantages of the present invention will become apparent from the following detailed description, the accompanying drawings, and the appended claims.

DETAILED DESCRIPTION OF THE PREFERRED EMBODIMENT

Figure 4:
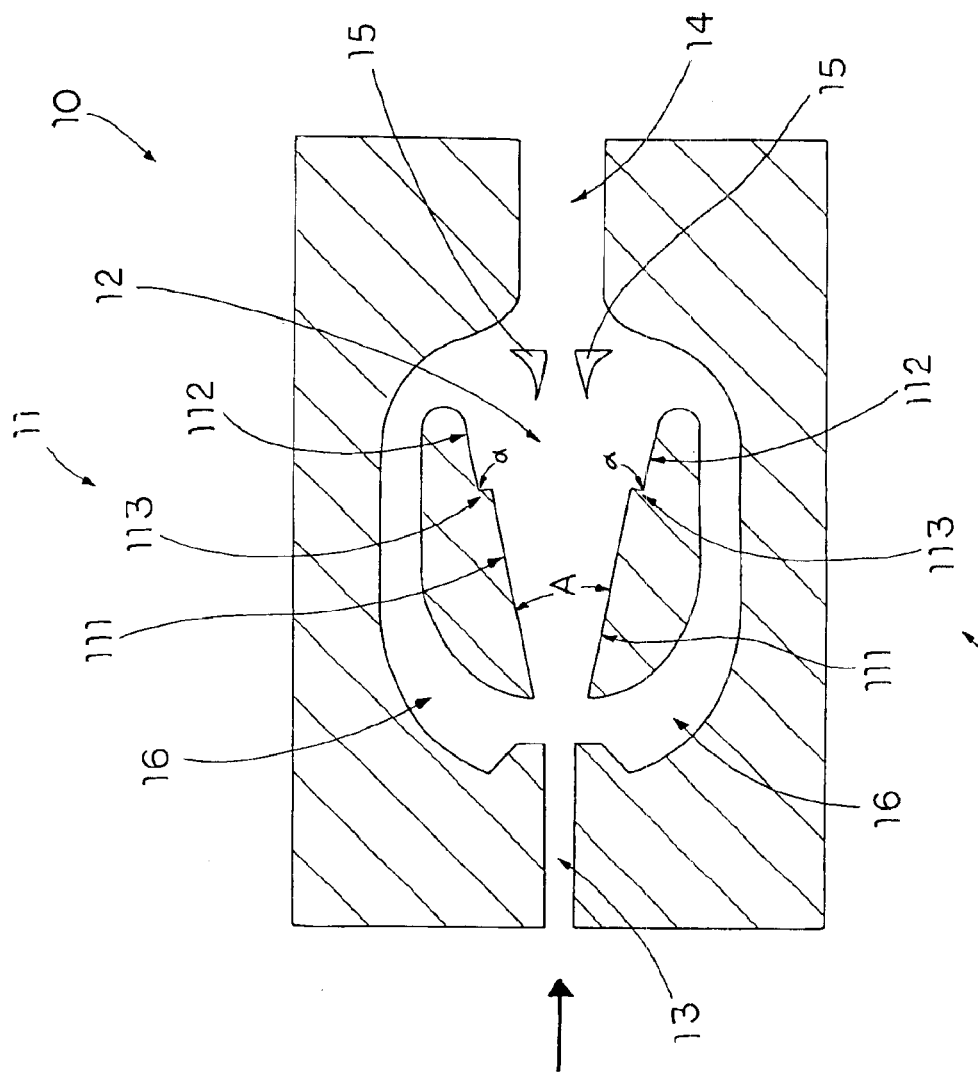
FIG. 4 is a sectional view of a fluidic oscillator according to a preferred embodiment of the present invention.
Figure 5:
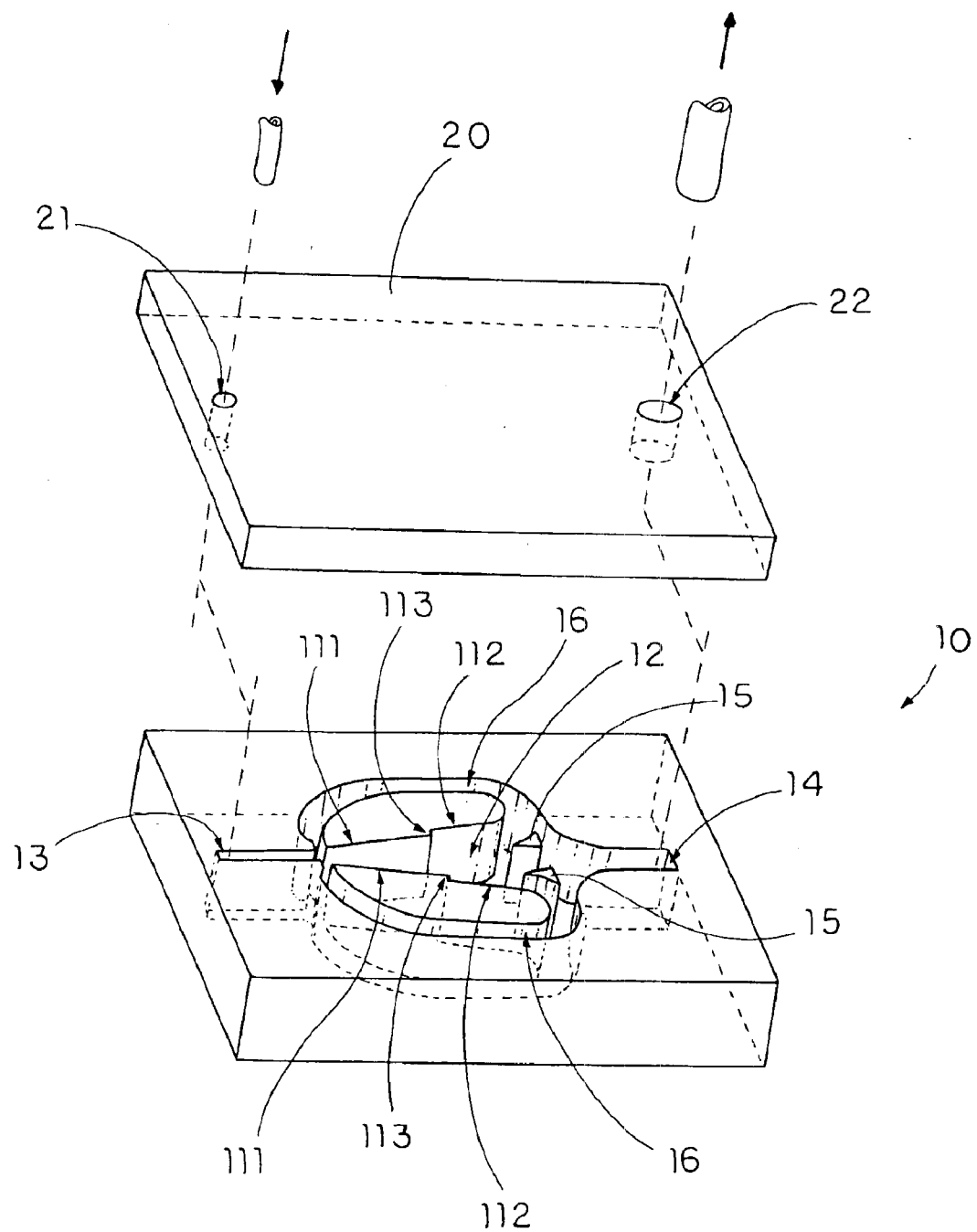
FIG. 5 is a perspective view of the fluidic oscillator according to the above preferred embodiment of the present invention.

Refer ring to FIGS. 4 and 5, a fluidic oscillator according to a preferred embodiment of the present invention is illustrates, wherein the fluidic oscillator comprises an oscillator body 10 having two attachment walls 11 defining an oscillating chamber 12 therebetween, an inlet duct 13 communicatively extended from the oscillating chamber 12 for guiding a flow of fluid entering into the oscillating chamber 12, an outlet duct 14 communicatively extend ed from the oscillating chamber 12 to align with the inlet duct 13 for guiding the flow of fluid exiting from the oscillating chamber 12, a flow splitter 15 provided at the outlet duct 14 to communicate with the oscillating chamber 12, and two feedback channels 16 communicating with the oscillating chamber 12.

Each of the feedback channels 16 is extended from the outlet duct 14 at the flow splitter 15 to the inlet duct 13 for splitting the flow of fluid to flow from the oscillating chamber 12 back to the inlet duct 13. To amplify the feedback effect, the angle of the flow splitter 15 is altered from 80° to 105°. Although the excitation in the inlet duct 13 is thus enhanced, the pressure drag exerted on the inlet flow by the recirculating bubble also increased, which circumvented the positive effect. In general, the flow splitter 15 not only controls the flow rates diverted into the feedback channels 16, but also manipulates the development of the recirculating bubble. Preferably, a sharp angle between 80° and 90° of the flow splitter 15 will generate the best performance curve.

Each of the attachment walls 11 has an upstream portion 111 and a downstream portion 112 integrally extended therefrom as a step shouldering manner to form a modulating shoulder 113 for modulating an oscillation of the flow within the oscillation chamber 12 so as to stabilize the flow of the fluid to pass through the oscillator body 10.

According to the preferred embodiment, the two attachment walls 11 are inclinedly extended from the inlet duct 13 to the outlet duct 14 to define a span angle A between the two attachment walls 11 such that a width of the oscillating chamber 12 is increasing from the inlet duct 13 to the outlet duct 14.

The span angle A has an operation range from 10° to 60°. Accordingly, the operation range of the span angle A is optimized within 20° to 30° wherein the span angle A at 20° is configured for a relatively larger flow of fluid and the span angle A at 30° is configured for a relatively lower flow of fluid.

As shown in FIG. 4, the modulating shoulder 113 is integrally formed between the upstream portion 111 of each of the attachment walls 11 and the downstream portion 112 thereof to define a step-shouldering angle a of the modulating shoulder 113, wherein the step-shouldering angle a of the modulating shoulder 113 is preferably formed at 90°. In other words, the span angle A between the upstream portions 111 of the attachment walls 11 is the same as that between the downstream portions 112 of the attachment walls 11.

A ratio of the upstream portion 111 to the downstream portion 112 of each of the attachment walls is configured from 2:1 to 10:1. In addition, a ratio of a depth to width of the inlet duct 13 is configured from 1:10 to 1:100.

As shown in FIG. 5, the fluidic oscillator further comprises a sealing cover 20 sealedly mounted on the oscillator body 10 to conceal the oscillating chamber 12, wherein the sealing cover 20 has an inlet through hole 21 and an outlet through hole 22 spacedly formed thereon to align with the inlet duct 13 and the outlet duct 14 of the oscillator body 10 respectively for guiding the flow of fluid to flow into the inlet duct 13 through the inlet through hole 21 and to flow out from the outlet duct 14 through the outlet through hole 22. It is worth to mention that no protrusion should be formed on the sealing cover 20 within the oscillating chamber 12 when the sealing cover 20 is sealed on the oscillator body 10 so as to prevent any interference of the fluid within the oscillating chamber 12.

According to the preferred embodiment, when the fluid enters to the inlet duct 13, the flow of fluid is jetting towards the oscillating chamber 12. At the mean time, a small number of recirculating bubbles may form within the oscillating chamber 12 and flow towards the outlet duct 14. Once the fluid fully fills up the oscillating chamber 12 (it may take few seconds), the fluid will start to oscillate within the oscillating chamber 12 while the recirculating bubbles are rapidly discharged from the oscillator body 10 during oscillation.

In order to illustrate the efficiency of the fluidic oscillator of the present invention, the plane attachment walls of the conventional fluidic oscillator (plane-wall oscillator) is used as a reference to compare with the step-shouldering attachment walls 11 of the fluid oscillator (step-wall oscillator) of the present invention.

Figure 6:
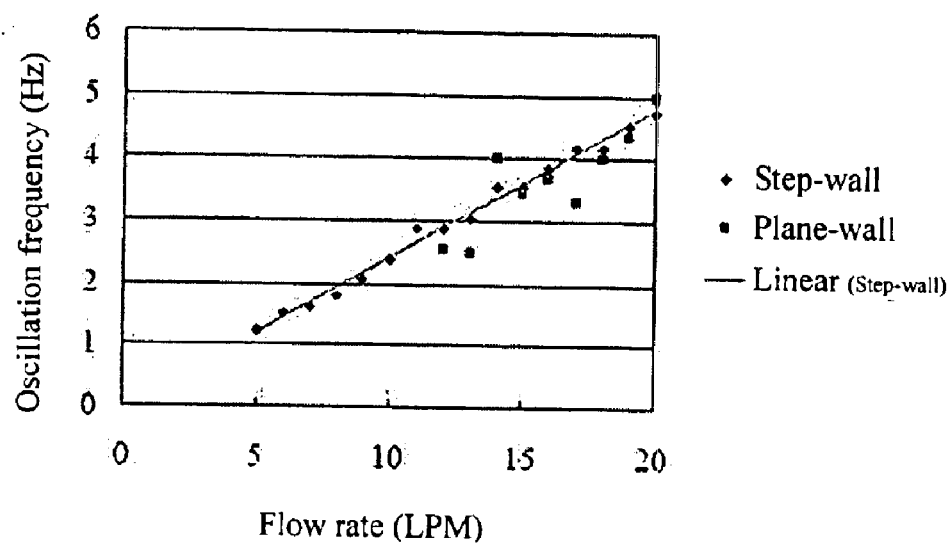
FIG. 6 is a diagram illustrating the relationship between the oscillation frequency and the flow rate by using the fluidic oscillator according to the above preferred embodiment of the present invention.
Figure 7:
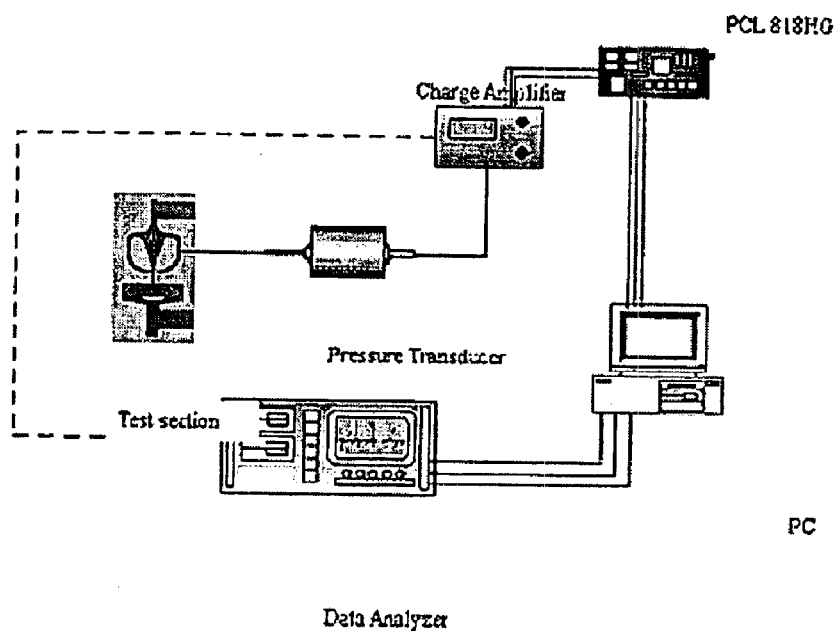
FIG. 7 illustrates a testing system for the fluidic oscillator according to the above preferred embodiment of the present invention.

FIG. 6 illustrates the relationship between the oscillation frequency and the flow rate of the plane-wall oscillator and the step-wall oscillator. For the plane-wall oscillator, the oscillation frequency is direct proportional to the flow rate of the fluid in a non-linear manner. For the step-wall oscillator, the oscillation frequency is direct proportional to the flow rate of the fluid in a linear manner. Therefore, the stability of the step-wall oscillator during oscillation is better than that of the plane-wall oscillator.

In addition, for the plane-wall oscillator, the oscillation occurs when the flow rate of the fluid is larger than 12 L/min. Therefore, the plane-wall oscillator cannot measure the oscillation when the flow rate is lesser than 12 L/min such that the measuring range of the plane-wall oscillator is minimized. However, the step-wall oscillator is adapted to measure the flow of the fluid from a relatively low flow rate of 5 L/min to a relatively high flow rate of 20 L/min.

Figure 1:
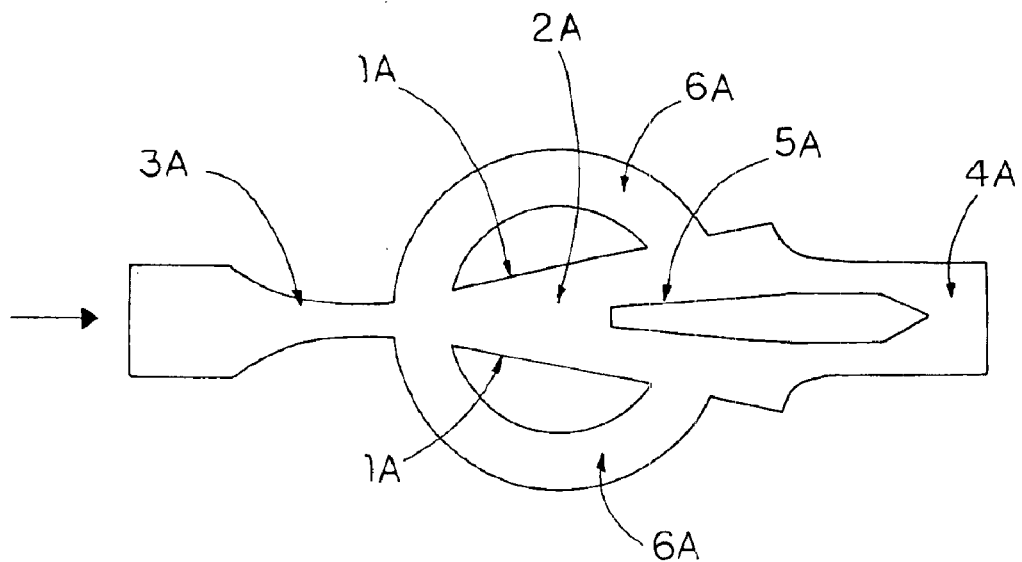
FIG. 1 is a sectional view of a first conventional fluidic oscillator.
Figure 2:
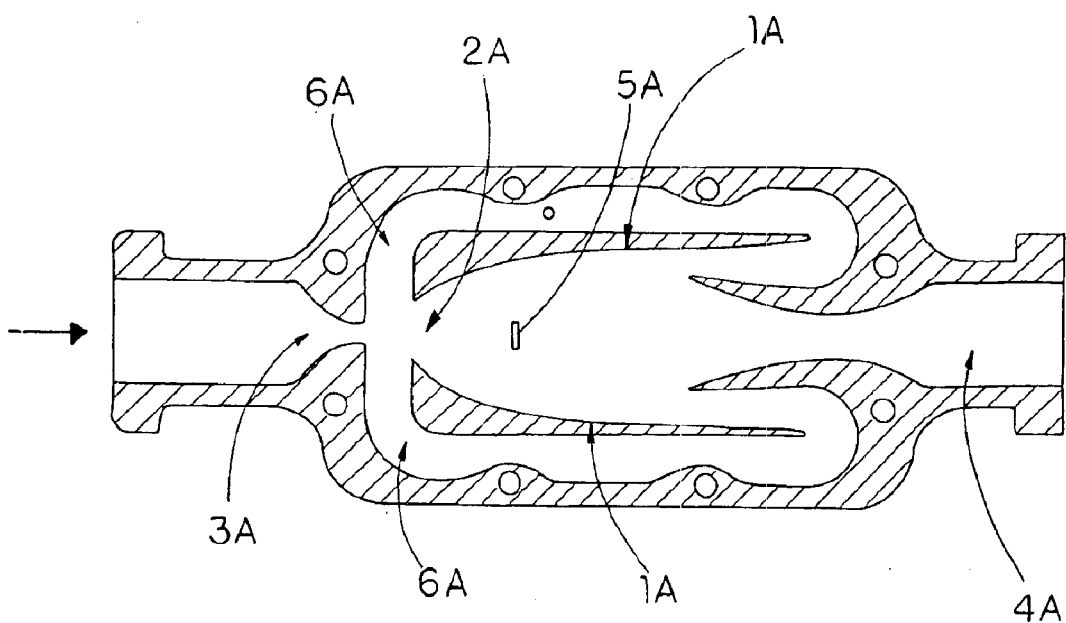
FIG. 2 is a sectional view of a second conventional fluidic oscillator.
Figure 3:
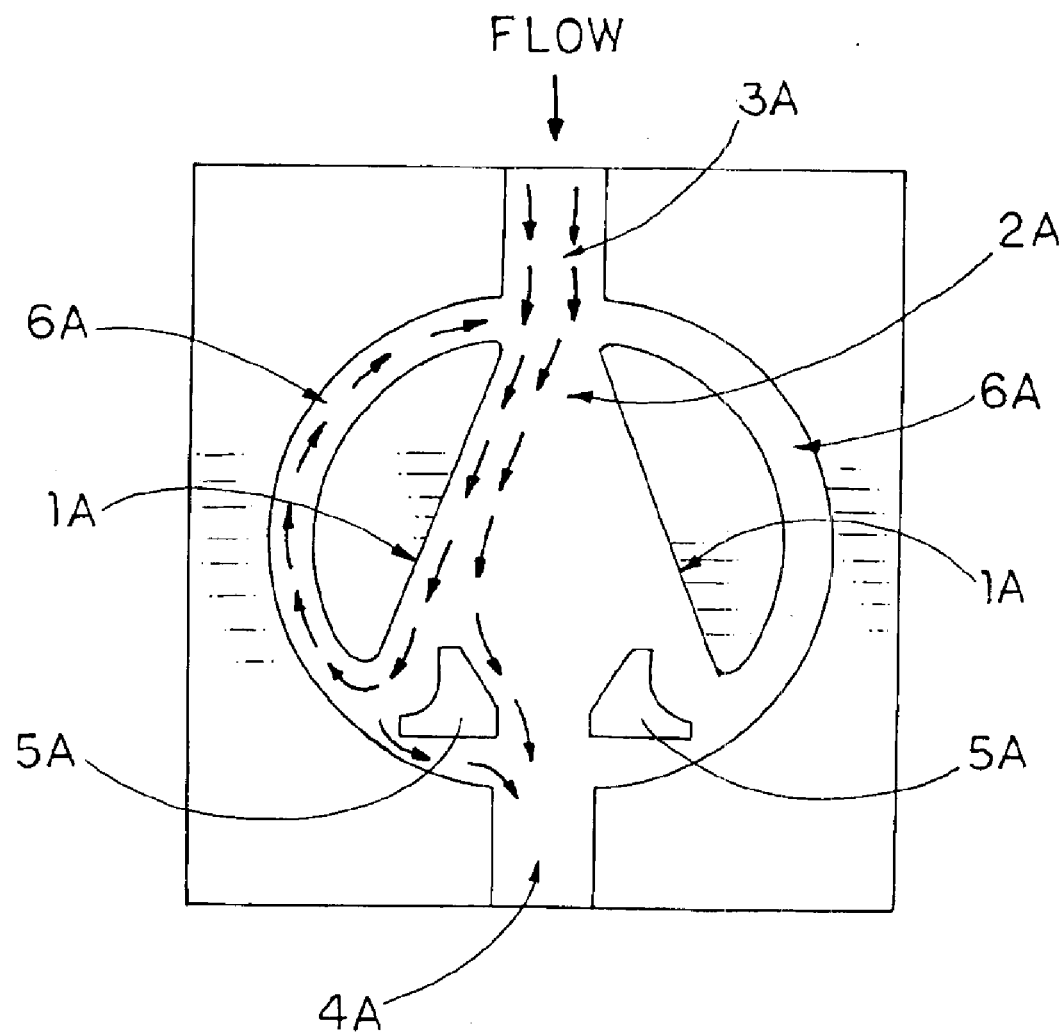
FIG. 3 is a sectional view a third conventional fluidic oscillator.

The best measurement point for the spectra analysis is located in the feedback channel 16 because the flow pattern is simple and the interference signal generated from the complicated flow is all damped out there. The cascade distributions of pressure spectra for the plane attachment walls of the conventional fluidic oscillator and step-shouldering attachment walls 11 of the fluidic oscillator of the present invention are shown in FIGS. 3 and 4 respectively.

The signal of the plane-wall oscillator exhibits complex spectra distribution and is very difficult to distinguish the major frequency at either a greater or a smaller flow rate of the fluid. The wave form corresponded to the step-wall oscillator has a distinct major oscillation frequency with very low noise background for the entire range of the flow rate.

For further investigation of the pressure signals, the signal to noise ratio (SNR) was introduced as follows.

$$SNR = \frac{V_{rms}(\text{main frequency})}{V_{rms}(\text{other frequecies})}$$

Accordingly, the $V_{rms}$ of the main frequency illustrates the frequency of the oscillation and the $V_{rms}$ of the other frequencies illustrate the turbulent frequencies, such that a higher SNR should be obtained for better performance of the fluidic oscillator since the turbulent of fluid should be minimized.

The comparison of SNR between the plane-wall oscillator and the step-wall oscillator indicates that the step-wall oscillator induces a much greater SNR over the entire experimental range. The SNR of the step-wall oscillator is even 17 times greater than that of the plane-wall oscillator, which revealed that the introduction of the step configuration improved the flow pattern in the oscillating chamber 12, and that enhance effect increased with increasing flow rate. The results of pressure spectra analysis are consistent with the analysis of flow visualization.

In addition, the total pressure losses between the outlet duct 14 and the inlet duct 13 at varied flow rates of the fluid for both types of fluidic oscillators, i.e. the plane attachment walls and the step-shouldering attachment walls 11, are also compared. In general, the total pressure loss is proportional to the flow-rate. The pressure loss of the step-wall oscillator is invariably greater than that of the plane-wall oscillator because of the flow separation at the edge of the modulating shoulder 113. Although the sudden expansion behind the modulating shoulder 113 enlarges the oscillation chamber 12 and improved the performance, the average pressure loss of the step-wall oscillator increases 20% over the measurement range. The magnitudes of Euler number is shown for both fluidic oscillators are similar over Reynolds numbers 8000 to 45000. The pressure loss gradually surpasses the flow inertia as the Reynolds number is kept decreasing below 8000; the Euler number thus raises quickly and the flow oscillation diminishes.

Furthermore, a comparison of the temporal variations of flow structure via phase averaged PIV measurement and numerical modeling for the plane-wall oscillator and the step-wall oscillator at a flow rate 15 L/min is illustrated.

The recirculating bubble is relatively large and the recirculation intensity is stronger for the plane-wall oscillator, and that would surpass the excitation force in the inlet duct 13 and impede the oscillation, especially for the case of small flow rate. For the case of great flow rate, the opposite effect occurred, while the oscillation is no longer periodic. These temporal and spatial variations of hydrodynamic structure satisfactorily interpret the spectra cascades and SNR. The flow structure of the step-wall oscillator is distinct from that of the plane-wall oscillator. The upstream vortex breaks down near the modulating shoulder 113 and the new recirculating bubble originates from the separation point of the modulating shoulder 113 and is located between the flow splitter 15 and modulating shoulder 113. The recirculating bubble of the step-wall oscillator is invariably restrained behind the modulating shoulder 113 and remains the similar size. Moreover, the modulating shoulder 113 shields the recirculating bubble from suppressing the upstream flow. As a result, the oscillation behavior is stable and all the operation features, except the pressure loss, were notably improved.

The vertical velocity distributions along the horizontal cross section across the pressure center of the vortex are further analyzed at a flow rate 15 L/min to elucidate the local flow structure. The vertical velocity gradient across the recirculation bubble of the plane-wall of the fluidic oscillator is stronger and the recirculating intensity is greater in comparison with those of the step-shouldering attachment wall 11 of the fluidic oscillator. The differences of the velocities and mass flow rates between two feedback channels 16 are more profound for the plane-wall oscillator as compared to the step-wall oscillator. The vertical velocity gradient is also smaller for the step-wall oscillator as compared with that of the plane-wall oscillator and the recirculation zone is shielded by the modulating shoulder 113 from the upstream, which makes the initiation of the oscillation easier.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A fluidic oscillator, comprising:
   an oscillator body having two attachment walls defining an oscillating chamber therebetween, an inlet duct communicatively extended from said oscillating chamber for guiding a flow of fluid entering into said oscillating chamber, an outlet duct communicatively extended from said oscillating chamber to align with said inlet duct for guiding said flow of fluid exiting from said oscillating chamber, a flow splitter provided at said outlet duct to communicate with said oscillating chamber, and two feedback channels communicating with said oscillating chamber;
   wherein each of said feedback channels is extended from said outlet duct at said flow splitter to said inlet duct for splitting said flow of fluid to flow from said oscillating chamber back to said inlet duct;
   wherein each of said attachment walls has an upstream portion and a downstream portion integrally extended therefrom as a step shouldering manner to form a modulating shoulder for modulating an oscillation of said flow within said oscillation chamber so as to stabilize said flow of fluid to pass through said oscillator body.

2. A fluidic oscillator, as recited in claim 1, wherein said modulating shoulder is integrally formed between said upstream portion of each of said attachment walls and said downstream portion thereof to define a step-shouldering angle of said modulating shoulder, wherein said step-shouldering angle of said modulating shoulder is formed at 90°.

3. A fluidic oscillator, as recited in claim 1, wherein a ratio of said upstream portion to said downstream portion of each of said attachment walls is configured from 2:1 to 10:1.

4. A fluidic oscillator, as recited in claim 2, wherein a ratio of said upstream portion to said downstream portion of each of said attachment walls is configured from 2:1 to 10:1.

5. A fluidic oscillator, as recited in claim 1, wherein said two attachment walls are inclinedly extended from said inlet duct to said outlet duct to define a span angle between said two attachment walls such that a width of said oscillating chamber is increasing from said inlet duct to said outlet duct, wherein said span angle has an operation range from 10° to 60°.

6. A fluidic oscillator, as recited in claim 2, wherein said two attachment walls are inclinedly extended from said inlet duct to said outlet duct to define a span angle between said two attachment walls such that a width of said oscillating chamber is increasing from said inlet duct to said outlet duct, wherein said span angle has an operation range from 10° to 60°.

7. A fluidic oscillator, as recited in claim 4, wherein said two attachment walls are inclinedly extended from said inlet duct to said outlet duct to define a span angle between said two attachment walls such that a width of said oscillating chamber is increasing from said inlet duct to said outlet duct, wherein said span angle has an operation range from 10° to 60°.

8. A fluid oscillator, as recited in claim 1, wherein a ratio of depth to width of said inlet duct is configured from 1:10 to 1:100.

9. A fluid oscillator, as recited in claim 2, wherein a ratio of depth to width of said inlet duct is configured from 1:10 to 1:100.

10. A fluid oscillator, as recited in claim 4, wherein a ratio of depth to width of said inlet duct is configured from 1:10 to 1:100.

11. A fluid oscillator, as recited in claim 7, wherein a ratio of depth to width of said inlet duct is configured from 1:10 to 1:100.

12. A fluid oscillator, as recited in claim 1, further comprising a sealing cover sealedly mounted on said oscillator body to conceal said oscillating chamber, wherein said sealing cover has an inlet through hole and an outlet through hole spacedly formed thereon to align with said inlet duct and said outlet duct of said oscillator body respectively for guiding said flow of fluid to flow into said inlet duct through said inlet through hole and to flow out from said outlet duct through said outlet through hole.

13. A fluid oscillator, as recited in claim 2, further comprising a sealing cover sealedly mounted on said oscillator body to conceal said oscillating chamber, wherein said sealing cover has an inlet through hole and an outlet through hole spacedly formed thereon to align with said inlet duct and said outlet duct of said oscillator body respectively for guiding said flow of fluid to flow into said inlet duct through said inlet through hole and to flow out from said outlet duct through said outlet through hole.

14. A fluid oscillator, as recited in claim 4, further comprising a sealing cover sealedly mounted on said oscillator body to conceal said oscillating chamber, wherein said sealing cover has an inlet through hole and an outlet through hole spacedly formed thereon to align with said inlet duct and said outlet duct of said oscillator body respectively for guiding said flow of fluid to flow into said inlet duct through said inlet through hole and to flow out from said outlet duct through said outlet through hole.

15. A fluid oscillator, as recited in claim 7, further comprising a sealing cover sealedly mounted on said oscillator body to conceal said oscillating chamber, wherein said sealing cover has an inlet through hole and an outlet through hole spacedly formed thereon to align with said inlet duct and said outlet duct of said oscillator body respectively for guiding said flow of fluid to flow into said inlet duct through said inlet through hole and to flow out from said outlet duct through said outlet through hole.

16. A fluid oscillator, as recited in claim 11, further comprising a sealing cover sealedly mounted on said oscillator body to conceal said oscillating chamber, wherein said sealing cover has an inlet through hole and an outlet through hole spacedly formed thereon to align with said inlet duct and said outlet duct of said oscillator body respectively for guiding said flow of fluid to flow into said inlet duct through said inlet through hole and to flow out from said outlet duct through said outlet through hole.

17. A fluidic oscillator, as recited in claim 1, wherein an angle of said flow splitter is configured from 800 to 105° for amplifying a feedback effect.

18. A fluidic oscillator, as recited in claim 7, wherein an angle of said flow splitter is configured from 80° to 105° for amplifying a feedback effect.

19. A fluidic oscillator, as recited in claim 11, wherein an angle of said flow splitter is configured from 80° to 105° for amplifying a feedback effect.

20. A fluidic oscillator, as recited in claim 16, wherein an angle of said flow splitter is configured from 80° to 105° for amplifying a feedback effect.

* * * * *